US012624208B2

(12) United States Patent
Zhao et al.

(10) Patent No.: US 12,624,208 B2
(45) Date of Patent: May 12, 2026

(54) LOW-SHEAR VISCOSITY REDUCING ADDITIVE

(71) Applicants: Dow Silicones Corporation, Midland, MI (US); Dow Global Technologies LLC, Midland, MI (US)

(72) Inventors: Dan Zhao, Midland, MI (US); Shane Mangold, Midland, MI (US); Richard Cooper, Schwenksville, PA (US); Dongchan Ahn, Midland, MI (US); Kyle McDonald, Midland, MI (US); Joseph Sootsman, Auburn, MI (US); Darren Hansen, Auburn, MI (US)

(73) Assignees: Dow Silicones Corporation, Midland, MI (US); Dow Global Tecjnologies LLC, Midland, MI (US)

( * ) Notice: Subject to any disclaimer, the term of this patent is extended or adjusted under 35 U.S.C. 154(b) by 392 days.

(21) Appl. No.: 18/251,315

(22) PCT Filed: Jan. 13, 2022

(86) PCT No.: PCT/US2022/012262

§ 371 (c)(1),
(2) Date: May 1, 2023

(87) PCT Pub. No.: WO2022/164641

PCT Pub. Date: Aug. 4, 2022

(65) Prior Publication Data

US 2023/0407093 A1 Dec. 21, 2023

Related U.S. Application Data

(60) Provisional application No. 63/142,086, filed on Jan. 27, 2021.

(51) Int. Cl.

| | |
|---|---|
| ***C08L 83/06*** | (2006.01) |
| ***C08K 3/08*** | (2006.01) |
| ***C08K 3/22*** | (2006.01) |
| ***C08K 3/36*** | (2006.01) |
| ***C08K 7/18*** | (2006.01) |
| ***C08K 9/02*** | (2006.01) |

(52) U.S. Cl.

CPC ................ *C08L 83/06* (2013.01); *C08K 3/08* (2013.01); *C08K 3/22* (2013.01); *C08K 3/36* (2013.01); *C08K 7/18* (2013.01); *C08K 9/02* (2013.01); *C08K 2003/0806* (2013.01); *C08K 2003/2227* (2013.01); *C08K 2003/2296* (2013.01); *C08K 2201/005* (2013.01); *C08K 2201/014* (2013.01); *C08L 2205/025* (2013.01)

(58) Field of Classification Search

CPC .... C08L 83/06; C08L 2205/025; C08L 83/04; C08K 3/08; C08K 3/22; C08K 3/36; C08K 7/18; C08K 9/02; C08K 2003/0806; C08K 2003/2227; C08K 2003/2296; C08K 2201/005; C08K 2201/014; C08G 77/04; C08G 77/14

See application file for complete search history.

(56) References Cited

U.S. PATENT DOCUMENTS

| | | | | |
|---|---|---|---|---|
| 5,221,339 | A | 6/1993 | Takahashi et al. | |
| 6,599,631 | B2 | 7/2003 | Kambe et al. | |
| 7,452,957 | B2 | 11/2008 | Sayre | |
| 7,781,063 | B2 | 8/2010 | Smith et al. | |
| 9,499,671 | B2 | 11/2016 | Narayan et al. | |
| 9,593,275 | B2 * | 3/2017 | Tang | C09J 183/06 |
| 2005/0020738 | A1 | 1/2005 | Jackson et al. | |
| 2005/0129956 | A1 | 6/2005 | Rubinsztajn et al. | |
| 2008/0108531 | A1 | 5/2008 | Burrington et al. | |
| 2012/0309921 | A1 | 12/2012 | Taniguchi et al. | |
| 2019/0169211 | A1 | 6/2019 | Urano et al. | |
| 2021/0277243 | A1 * | 9/2021 | Eckberg | B05D 3/0272 |

FOREIGN PATENT DOCUMENTS

| | | | |
|---|---|---|---|
| CN | 103709757 | 4/2014 | |
| CN | 104673190 | 6/2015 | |
| CN | 106190010 | 12/2016 | |
| CN | 107955333 | 4/2018 | |
| CN | 109354872 | 2/2019 | |
| DE | 19734245 | 2/1999 | |
| GB | 1470058 | 4/1977 | |
| JP | 4412578 | 2/2010 | |
| JP | 2014015557 | 1/2014 | |
| JP | 2019001875 | 1/2019 | |
| WO | WO-2020053357 A1 * | 3/2020 | C08K 5/1539 |

OTHER PUBLICATIONS

Arkles, "Reactive Silicones: Forging New Polymer Links", Gelest, 2016, Ver. 6.

Liu, "Effect of thixotropic agent on the properties of conductive silicone rubber gasket for EMI shielding", Advanced Materials Research, 2011, vols. 239-242, pp. 3350-3353.

* cited by examiner

*Primary Examiner* — Robert S Jones, Jr.
*Assistant Examiner* — Joshua Caleb Bledsoe
(74) *Attorney, Agent, or Firm* — Steven W. Mork

(57) ABSTRACT

A composition contains: (a) a first polyorganosiloxane; (b) 50-80 volume percent, based on composition volume, of conductive fillers; and (c) 0.1 to 2.0 weight-percent, based on composition weight, of a second polyorganosiloxane different from the first polyorganosiloxane, the second polyorganosiloxane having an average of 0.5 to 1.5 anhydride groups per molecule.

8 Claims, No Drawings

LOW-SHEAR VISCOSITY REDUCING ADDITIVE

FIELD OF THE INVENTION

The present invention relates to conductive compositions of conductive filler dispersed in a polyorganosiloxane matrix that includes low-shear viscosity reducing additive.

INTRODUCTION

Thermally and electrically conductive (jointly, "conductive") composites are generally polyorganosiloxane matrix materials filled with conductive filler particles to enhance the conductivity through the matrix material. Conductive composites are useful for enhancing the conductivity between two components by serving as an interface material between the two components. In some applications it is desirable for conductive composites to have a relatively high low-shear viscosity in order to have positional stability—that is, to enhance the ability of the conductive composite to remain in a particular position and shape upon application. However, in other applications it is desirable for conductive compositions to have a low viscosity at low shear such as in self-leveling applications and those applications where the composition must be pressed to a particularly thin layer between components. Applications where the conductive composition is poured into a form or onto a substrate also benefit from a low low-shear viscosity so the conductive composition can flow over the form or substrate and fill pores, voids or gaps, and/or flow around objects such as wires. It is these latter conductive compositions that have a low viscosity at low shear that are the subject of the present invention.

A technical challenge in conductive composites is in enhancing conductivity by increasing filler loading while achieving a low enough composite viscosity to meet application needs. Generally, increasing the concentration of conductive filler will increase the conductivity of the composite but will also increase the viscosity of the composite. In order to maximize the amount of conductive filler, it is desirable to find a way to reduce the low-shear viscosity of a conductive composite without reducing the concentration of conductive filler. Even more desirable is to identify such an additive that is a polysiloxane-based additive so that the additive is optimally compatible with the polyorganosiloxane matrix of the conductive composite.

BRIEF SUMMARY OF THE INVENTION

The present invention provides a polyorganosiloxane-based additive that lowers the low-shear viscosity of a conductive composite without reducing the concentration of conductive filler. The present invention is a result of discovering that a polyorganosiloxane additive with an average of 0.5 to 1.5 anhydride groups per polyorganosiloxane molecule can be added to a conductive composite at a concentration of 0.1 to 2.0 weight-percent, based on conductive composite weight, and reduce the low-shear viscosity of the conductive composite without reducing the filler loading.

Surprisingly, the anhydride-functional polyorganosiloxane additive can have a higher dynamic viscosity than the polymer that serves as the primary matrix material of the composition to which the additive is added, yet the additive can still reduce the composition viscosity.

In a first aspect, the present invention is a composition comprising: (a) a first polyorganosiloxane; (b) 50-80 volume percent, based on composition volume, of conductive fillers; and (c) 0.1 to 2.0 weight-percent, based on composition weight, of a second polyorganosiloxane different from the first polyorganosiloxane, the second polyorganosiloxane having an average of 0.5 to 1.5 anhydride groups per molecule.

The present invention is useful as a conductive composite.

DETAILED DESCRIPTION OF THE INVENTION

Test methods refer to the most recent test method as of the priority date of this document when a date is not indicated with the test method number. References to test methods contain both a reference to the testing society and the test method number. The following test method abbreviations and identifiers apply herein: ASTM refers to ASTM International methods; EN refers to European Norm; DIN refers to Deutsches Institut für Normung; ISO refers to International Organization for Standards; and UL refers to Underwriters Laboratory.

Products identified by their tradename refer to the compositions available under those tradenames on the priority date of this document.

"Multiple" means two or more. "And/or" means "and, or as an alternative". All ranges include endpoints unless otherwise indicated.

"Hydrocarbyl" refers to a univalent group formed by removing a hydrogen atom from a hydrocarbon and includes alkyl and aryl groups.

"Alkyl" refers to a hydrocarbon radical derivable from an alkane by removal of a hydrogen atom. An alkyl can be linear or branched.

"Aryl" refers to a radical formable by removing a hydrogen atom from an aromatic hydrocarbon.

"Low-Shear Viscosity" for a composition is determined according to the following oscillatory shear strain amplitude sweep ("Strain Sweep") method. Provide a pair of 25 millimeter (mm) diameter round parallel serrated plates (part number 401978.901 from TA Instruments, New Castle, DE, USA). Dispose a sample composition onto one of the plates and press the other plate against the sample composition until the plates are parallel to one another with a gap spacing between them of 1.0 mm with the sample composition in thermal contact with both plates and filling the gap spacing between the plates. Using an ARES-G2 strain-controlled rheometer (TA Instruments, New Castle, DE, USA), conduct a logarithmic sweep of strain amplitude from 0.01 percent (%) to 300% on the sample composition with 20 sampling points per decade using an angular frequency of 10 radians per second at 25 degrees Celsius (° C.). Record Complex Viscosity in Pascal*seconds (Pa*s) as a function of Percent Oscillation Strain Amplitude. The "Low-Shear Viscosity" is the complex viscosity recorded at the lowest shear amplitude value at which the recorded oscillation torque amplitude is above 0.1 microNewton*meter (or, equivalently, at which the recorded oscillation stress amplitude is above 0.0326 Pascals).

Determine dynamic viscosity for polyorganosiloxanes using an Anton-Paar Physical MCR 301 rheometer fitted with a 25 millimeter stainless steel cone-in-plate fixture at an operative temperature of 25° C. Perform steady shear measurements at shear rates ranging from 0.1 to 500 $s^{-1}$. Prior to each measurement allow the material to equilibrate for at least 5 minutes. The dynamic viscosity is the average viscosity over the shear rate from 0.1-10 $s^{-1}$.

Determine the composition and average number of siloxane units in a polysiloxane using $^{29}Si$, $^{13}C$, and $^{1}H$ nuclear magnetic resonance spectroscopy (see, e.g., *The Analytical Chemistry of Silicones*, Smith, A. Lee, ed., John Wiley & Sons: New York, 1991, p. 347ff.).

The composition of the present invention comprises a first polyorganosiloxane, a second polyorganosiloxane and conductive filler. The first and second polyorganosiloxanes form a polymer matrix in which the conductive filler resides as particles dispersed throughout the polymer matrix.

The first polyorganosiloxane is desirably the primary matrix material component. The first polyorganosiloxane can be, and desirably is, free of anhydride functional groups.

The first polyorganosiloxane is desirably a linear polyorganosiloxane. Linear polyorganosiloxanes comprise primarily, and can consist of, $R_3SiO_{1/2}$ and $R_2SiO_{2/2}$ siloxane units where each R is independently selected from a group consisting of organic groups, desirably hydrocarbyl groups including alkyl and aryl groups. The first polyorganosiloxane can have chemical structure (I):

$$R'R_2SiO—(R_2SiO)_m—SiR_2R' \quad (I)$$

where each R and R' is independently in each occurrence selected from a group consisting of $C_1$-$C_8$ hydrocarbyl groups and "m" is selected so that the first polyorganosiloxane has a dynamic viscosity in a range of 0.04 to 55 Pascal*seconds (Pa*s).

For example, R' groups can be independently in each occurrence selected from alkenyl groups while the R groups can be independently in each occurrence selected from aryl and alkyl groups. For instance, the R' groups can be vinyl groups and the R groups can be independently in each occurrence selected from phenyl and methyl groups.

The dynamic viscosity of the first polyorganosiloxane is desirably 0.04 Pascal*seconds (Pa*s) or more, 0.10 Pa*s or more, 0.5 Pa*s or more, 1.0 Pa*s or more, 5.0 Pa*s or more, 10 Pa*s or more, 15 Pa*s or more, 20 Pa*s or more, 25 Pa*s or more, 30 Pa*s or more, 35 Pa*s or more, 40 Pa*s or more, 45 Pa*s or more, even 50 Pa*s or more while at the same time typically has a dynamic viscosity of 100 Pa*s or less, 75 Pa*s or less, 60 Pa*s or less, 55 Pa*s or less, 50 Pa*s or less, 45 Pa*s or less, 40 Pa*s or less, 35 Pa*s or less, 30 Pa*s or less, 25 Pa*s or less, 20 Pa*s or less, 15 Pa*s or less, 10 Pa*s or less, 5 Pa*s or less or even 1.0 Pa*s or less, an the value for "m" is selected to achieve that viscosity based on the selection of R and R'.

The value for "m" can be, for instance, 30 or more, 40 or more, 50 or more, 60 or more, 70 or more, 80 or more, 90 or more, 100 or more, 120 or more, 140 or more, 160 or more, 180 or more, 200 or more, 250 or more, 300 or more, 350 or more, 400 or more, 450 or more, even 500 or more while at the same time the value for "m" is typically 800 or less, 700 or less, 600 or less or even 500 or less.

The second polyorganosiloxane is different from the first polyorganosiloxane and is, or comprises, polyorganosiloxanes having anhydride group functionality. The second polyorganosiloxane has an average concentration of anhydride groups of 0.5 or more, preferably 0.56 or more and can be 0.6 or more, 0.70 or more, 0.80 or more, 0.90 or more, 1.0 or more, 1.1 or more, 1.2 or more, 1.3 or more, even 1.4 or more while at the same time is fewer than 2.0, preferably is 1.75 or fewer, 1.5 or fewer, and can be 1.4 or fewer, 1.3 or fewer, 1.2 or fewer, 1.1 or fewer, 1.0 or fewer, 0.9 or fewer, 0.8 or fewer, 0.7 or fewer, even 0.6 or fewer per molecule. If the second polyorganosiloxane is a blend of more than one polyorganosiloxane then the polyorganosiloxane present in greatest concentration has fewer than 2 anhydride groups per molecule.

The second polyorganosiloxane can have a higher dynamic viscosity than the first polyorganosiloxane. Yet, surprisingly, addition of the second polyorganosiloxane can result in a reduction of low-shear viscosity of a composition comprising the first polyorganosiloxane as a polymer matrix even while keeping the filler content of the composition the same.

The second polyorganosiloxane can be a reaction product that includes a combination of reaction products resulting from a functionalization reaction that introduces the anhydride functionality onto the polyorganosiloxane. For instance, anhydride can be introduced onto a polysiloxane by either radical grafting or hydrosilylation, each with unique reaction products.

The anhydride functional group can be added onto a polysiloxane by radical grafting. For example, an alkenyl functional polysiloxane (for example, a vinyl functional polyorganosiloxane) can be combined with an unsaturated anhydride (for example, maleic anhydride) in the presence of a radical initiator and a free radical grafting reaction can occur between the alkenyl group of the polysiloxane and the unsaturated portion of the anhydride so as to graft the anhydride onto the polyorganosiloxane. The reaction is often run with an aromatic initiator and/or in an aromatic solvent, which results in a radical of the initiator and/or solvent also becoming grafted onto the anhydride. As an example, vinyl functional polyorganosiloxane can be combined with maleic anhydride in an aromatic solvent (such as xylene or toluene) along with a radical initiator such as dibenzoyl peroxide and then heated to initiate a free radical reaction:

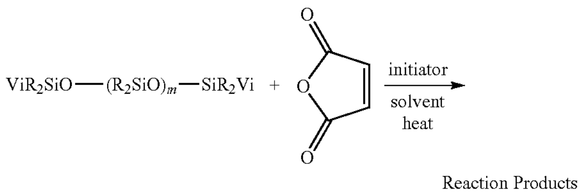

where the Reaction Products can have any of the following compounds present, depending on the molar ratio of reactants:

(a) Unreacted vinyl functional polyorganosiloxane: $ViR_2SiO—(R_2SiO)_m—SiR_2Vi$;

(b) Monofunctionalized polyorganosiloxane: $ViR_2SiO—(R_2SiO)_m—SiR_2A$ (c) Difunctionalized polyorganosiloxane: $AR_2SiO—(R_2SiO)_m—SiR_2A$;

where: R is as defined previously above; Vi refers to a vinyl group, and "A" is:

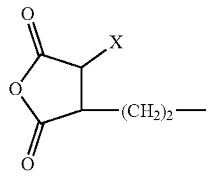

with X being an aromatic group that is a remnant of the solvent (for example, a tolyl or xylyl group) or a remnant of the initiator (for example, a benzoyl group) or hydrogen if the radical did not graft onto or did not remain grafted onto the anhydride.

Prepare the second polyorganosiloxane with a molar excess of the vinyl functional polyorganosiloxane in order to ensure an anhydride concentration of less than 2 per molecule. In the present invention, it is desirable for the dominant graft reaction product (the one present at the highest concentration) to be the monofunctionalized polyorganosiloxane (b). The reaction product mixture, which can include (a), (b) and (c) can be used together as the first polyorganosiloxane.

The second polyorganosiloxane can be prepared using a hydrosilylation reaction. For example, a silylhydride (SiH) terminal polyorganosiloxane can be reacted with an alkenyl functional anhydride (such as allyl succinic anhydride) in the presence of a catalyst. Select the molar ratio of reactants to provide the average anhydride concentration for the reaction products. The reaction is desirably run with a molar excess of the SiH terminal polyorganosiloxane so the average anhydride concentration on the reaction products is less than 2.

As an example of the silylhydride reaction synthesis, a linear SiH terminal polyorganosiloxane can be reacted with allyl succinic anhydride in the presence of a hydrosilylation catalyst (such as a platinum catalyst):

$HSiR_2SiO—(R_2SiO)_m—SiR_2SiH$ +

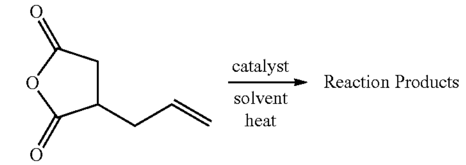

where the Reaction Products can have any of the following compounds present, depending on the molar ratio of reactants:

(a) Unreacted vinyl functional polyorganosiloxane: $HSiR_2SiO—(R_2SiO)_m—SiR_2SiH$;

(b) Monofunctionalized polyorganosiloxane: $HSiR_2SiO—(R_2SiO)_m—SiR_2A'$ (c) Difunctionalized polyorganosiloxane: $AR_2SiO—(R_2SiO)_m—SiR_2A'$;

where "A'" is:

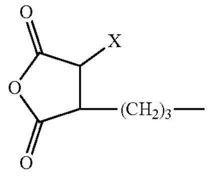

with X being hydrogen (H). The reaction product typically contains primarily (b) Monofunctionalized polyorganosiloxane. The reaction product can be used without further purification as the second polyorganosiloxane provided that the average anhydride functionality per polyorganosiloxane molecule is in the required range.

The second polyorganosiloxane can have average chemical structure (II):

$$R''R_2SiO—(R_2SiO)_n—SiR_2R'' \quad \text{(II)}$$

where "n" has an average value in a range of 40 to 200, R is independently in each occurrence selected from a group consisting of $C_1$-$C_8$ hydrocarbyl groups, and R" is independently in each occurrence selected from a group consisting of $C_1$-$C_8$ hydrocarbyl groups, silyl hydride, and anhydride groups. The anhydride group can be succinic anhydride of chemical structure (III):

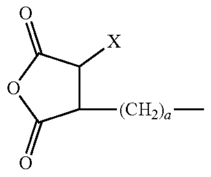

(III)

where X is independently in each occurrence selected from hydrogen and $C_1$-$C_8$ hydrocarbyl-containing groups and "a" is independently in each occurrence has a value of one or more, 2 or more, 3 or more, 4 or more, even 5 or more while at the same time 6 or less, 5 or less, 4 or less, 3 or less or even 2 or less. The $C_1$-$C_8$ hydrocarbyl-containing group can be any one or more than one aromatic group such as a remnant from an aromatic radical initiator such as benzoyl, or a remnant from an aromatic solvent such as xylyl or tolyl.

The second polyorganosiloxane can have an average chemical structure (II) where when "a" is 2 then X is independently in each occurrence selected from an aromatic group or hydrogen and when "a" is 3 then X is hydrogen.

The average concentration of anhydride functionality on the second polyorganosiloxane can be determined based on the number of reactive sites (for example, alkenyl and silylhydride groups) in the polyorganosiloxane prior to functionalizing with anhydride and then measuring the ratio of anhydride groups to number of reactive sites in the second polyorganosiloxane. Measure the number of reactive sites and anhydride groups using 1H nuclear magnetic resonance (NMR) spectroscopy or alternatively by Fourier Transform Infrared (FTIR) spectroscopy. Measure the number of reactive sites and anhydride groups using $^1H$ NMR spectroscopy using 1,4-dioxane as an internal standard. The concentration of functionalities such as silylhydride, alkenyl and anhydride can be calculated using the following calculation:

$$C_x=(I_x/I_{is})(N_{is}/N_x)(C_{is})$$

where: $I_x$ is the integral area of the functional group of interest (6.3-5.6 ppm for alkenyl, 4.8-4.5 ppm for silylhydride, and 3.5-2.0 ppm for anhydride), $I_{is}$ is the integral area of the internal standard (3.68 ppm), $N_{is}$ is the number of nuclei for the internal standard ($N_{is}$=8 in this instance), $N_x$ is the number of nuclei for the functional group of interest (1 for silylhydride, 6 for alkenyl and 5 for anhydride), $C_x$ is the concentration of the functional group of interest and $C_{is}$ is the concentration of the internal standard.

The composition of the present invention comprises conductive fillers. The fillers are filler particles that are any one or any combination of more than one type of filler selected from a group consisting of electrically conductive filler and thermally conductive fillers. Thermally conductive fillers include metal particles such as particles of aluminum, silver and copper; metal coated particles including particles of any type coated with a metal such as aluminum, silver and copper; inorganic particles such as particles of boron nitride, aluminum oxide (alumina), zinc oxide, magnesium oxide, aluminum nitride, and aluminum trihydrate; as well as carbonaceous material such as carbon nanotubes, graphene, and carbon fibers. Electrically conductive fillers include metal particles such as particles of silver, gold, platinum, palladium, nickel, copper and alloys thereof; particles of any kind coated with a metal such as silver, gold, platinum, palladium, nickel, copper and alloys thereof; as well as carbon black, carbon fibers, carbon nanotubes, and graphene. Desirably, the conductive fillers are any one or any combination of more than one filler selected from a group consisting of alumina, zinc oxide, alumina trihydrate, boron nitride, aluminum nitride, silver flake, and silver coated particulates.

The conductive fillers are present in the composition at a concentration of 50 volume-percent (vol %) or more, 55 vol % of more, 60 vol % or more, 65 vol % or more, 70 vol % or more, even 75 vol % or more while at the same time are typically present at a concentration of 80 vol % or less, 75 vol % or less, 70 vol % or less, 65 vol % or less, 60 vol % or less, or even 55 vol % or less based on composition volume.

The conductive fillers typically have an average particle size of 0.01 micrometers (μm) or more, 0.05 μm or more, 0.1 μm or more, 0.2 μm or more, 0.5 μm or more, 1.0 μm or more, 2.0 μm or more, 3.0 μm or more, 5.0 μm or more, 10 μm or more, 20 μm or more, m or more, 40 μm or more, 50 μm or more and can be 60 μm or more, 70 μm or more, 80 μm or more, 90 μm or more, even 100 μm or more while at the same time typically have an average particle size of 250 μm or less, 200 μm or less, 150 or less, 100 μm or less, 90 μm or less, 80 μm or less, 70 μm or less, 60 μm or less, 50 μm or less, 40 μm or less, 30 m or less, 20 μm or less, 10 μm or less, 5.0 μm or less, even 3.0 μm or less, 1.0 μm or less. Determine average particle size as the volume-weighted median value of particle diameter distribution (Dv50) of the polyorganosiloxane using a Mastersizer™ 3000 laser diffraction particle size analyzer from Malvern Instruments.

The conductive fillers can be a combination of particles having more than one average particle size. For instance, the conductive filler can be a group of conductive fillers that comprises two types, three type or even four or more types of conductive fillers each having an average particle size as described above but having different average particle sizes from the other types of conductive fillers in the group.

The compositions of the present invention can further comprise or be free of any one or combination of additional components beyond those already discussed herein. For example, the composition can further comprise (or be free of) a filler treating agent as part of the matrix material. Filler treating agents are desirable to improve dispersion of the filler into the matrix material, typically by reducing filler agglomeration and filler-filler interactions. Filler treating agents can also improve wet-out of the filler surfaces by matrix material, reduce viscosity of the composition and cap reactive groups on filler surfaces to prevent reactions with the filler that may reduce shelf life of the composition. Desirably, the treating agent comprises, or consists of, one or both of an alkyltrialkoxysilane and monotrialkoxysiloxy-terminated diorganopolysiloxane.

Examples of suitable alkyltrialkoxysilanes have the general formula: $(R^1)(R^2O)_3Si$; where $R^1$ is an alkyl desirably having 6 or more, 7 or more, 8 or more, 9 or more, 10 or more, 11 or more, 12 or more, 13 or more, 14 or more, 15 or more, even 16 or more carbon atoms while at the same time typically has 18 or fewer and can have 17 or fewer, 16 or fewer, 15 or fewer, 14 or fewer, 13 or fewer, 12 or fewer, 11 or fewer or even 10 or fewer carbon atoms on average per molecule; and $R^2$ is desirably an alkyl having one or more, 2 or more, 3 or more, 4 or more, 5 or more, even 6 or more while at the same time typically contains 10 or fewer, 9 or fewer, 8 or fewer, 7 or fewer, 6 or fewer, 5 or fewer, 4 or fewer, 3 or fewer, even 2 or fewer carbon atoms. Desirably, the alkyltrialkoxysilane is an alkyltrimethoxy silane with the alkyl group as described above. One example of a desirable alkyl trialkoxy silane is n-decyltrimethoxy silane. The concentration of alkyltrialkoxysilane in the composition is generally zero wt % or more, 0.05 wt % or more, 0.10 wt % or more, 0.20 wt % or more, 0.22 wt % or more, 0.24 wt % or more while at the same time is generally 0.30 wt % or less, preferably 0.28 wt % or less, 0.26 wt % or less 0.24 wt % or less and can be 0.22 wt % or less based on the composition weight.

Examples of suitable monotrialkoxysiloxy-terminated diorganopolysiloxanes generally have the following chemical structure (IV):

$$R_3SiO—(R_2SiO)_h—[(CH_2)_e((CH_3)_2SiO)_f]_g—(CH_2)_e—Si(OR^2)_3 \quad (IV)$$

where: R and $R^2$ are each independently in each occurrence as defined above; subscript h is the average number of $(R_2SiO)$ units per molecule and typically has a value of 10 or more, 15 or more, 20 or more, 25 or more, even 30 or more while at the same time is generally 150 or less, 140 or less, 130 or less, 120 or less, 110 or less, 100 or less, 90 or less, 80 or less, 70 or less, 60 or less, 50 or less, 45 or less, 40 or less, 35 or less or even 30 or less; subscript e has a value independently in each occurrence of zero or more, one or more, even two or more and at the same time is usually 4 or less, 3 or less or even 2 or less; subscript f typically has a value of zero or more, one or more, 2 or more, 3 or more and at the same time is generally 6 or less, 5 or less, 4 or less, 3 or less, or even 2 or less; and subscript g typically has a value of zero or more, one or more, 2 or more, 3 or more, even 4 or more while at the same time generally has a value of 6 or less, even 5 or less, 4 or less, or 3 or less.

Desirably, the monotrialkoxysiloxy-terminated diorganopolysiloxane has the general molecular structure (V):

$$(CH_3)_3SiO—((CH_3)_2SiO)_t—Si(OR^2)_3 \quad (V)$$

One particularly desirable trialkoxysiloxy-terminated diorganopolysiloxane has the composition of Formula (V) with $R^2$ equal to a methyl and subscript t has an average value of 130 or less, preferably 120 or less, preferably 110 or less, more preferably 110 or less 100 or less, 90 or less, 80 or less, 70 or less, 60 or less, 50 or less, 40 or less, or 30 or less while at the same time 20 more, preferably 30 or more so as to form a terminal trimethoxy functionalized silicon atom.

The concentration of monotrialkoxysiloxy-terminated diorganosiloxane is typically zero wt % or more, 0.10 wt % or more, 0.20 wt % or more, 0.30 wt % or more, 0.40 wt % or more, 0.50 wt % or more, 0.75 wt % or more, even 1.0 wt % or more or 2.0 wt % or more, while at the same time is generally 3.0 wt % or less, 2.0 wt % or less, 1.20 wt % or less, 1.15 wt % or less, or even 1.10 wt % or less based on composition weight.

The composition can further comprise (or be free of) any one or any combination of more than one additional component. Examples of such additional components include cure inhibitors, antioxidant stabilizers, pigments, viscosity modifiers, silica filler, and spacer additives. For avoidance of doubt, the composition can be free of any one or any combination or more than one of the additional components. For example, the composition can be free of silica filler. "Silica filler" refers to solid particulates that comprise silica including natural silica (such as crystalline quartz, ground quartz, and diatomaceous silica), and synthetic silica (such as fumed silica, fused silica, silica gel and precipitated silica). Additionally, or alternatively, the composition of the present invention can be free of polyether and/or silanol functional polydimethylsiloxane.

One example of a cure inhibitor is methyl(tris(1,1-dimethyl-2-propynyloxy))silane. When present, inhibitors are typically present at a concentration of 0.0001 wt % or more 0.001 wt % or more and at the same time is generally present at a concentration of 5 wt % or less, or even one wt % or less, even 0.5 wt % or less based on composition weight.

Antioxidant, if present, can be included typically at a concentration of 0.001 to one wt % of the composition weight. Antioxidants can be present alone or in combination with stabilizers. Antioxidants include phenolic antioxidants and stabilizers include organophosphorous derivatives.

Examples of pigments include carbon black, graphite, titanium dioxide, and copper phthalocyanine. When present, pigment tends to be present at a concentration of 0.0001 to one wt % based on composition weight.

Spacer additives are non-thermally conductive fillers and have average particle sizes in the range of 50-250 micrometers. Examples of spacers include glass and polymer beads.

The composition can be free of hydroxyl functional polysiloxanes and hydroxyl functional hydrocarbons.

Compositions of the present invention can be curable compositions. For example, the compositions can contain both alkenyl (for example, vinyl) group containing polyorganosiloxanes, polyorganosiloxanes containing silylhydride groups, and a silylation catalyst. Such a composition can undergo hydrosilylation crosslinking.

Composition of the present invention can be use as conductive interface materials to conductively couple two or more components. For example, the thermally conductive composition of the present invention can be used to thermally couple a heat source to a heat dissipating component by positioning the composition between and in thermal contact with the heat source and heat dissipating components. Electrically conductive composition of the present invention can be used to electrically couple two or more components by positioning the composition in electrical contact with the components. Electrically conductive compositions can also be used for electromagnetic interference (EMI) shielding. The composition is particularly useful for applying to locations where self-leveling or low-shear flowability is desired or required such as pouring into or onto a component so the composition will flow into, through, and/or around features of the component or other components being conductively coupled.

EXAMPLES

Characterization of Materials and Compositions

Low-Shear Viscosity. Determine the Low-Shear Viscosity for a composition as described herein above.

$^1$H NMR Analysis. Collect $^1$H NMR spectra using a Varian Unity INOVA 400 (400 MHz) spectrometer. Use 1,4-dioxane (3.68 ppm) as an internal standard. Use 64 scans and a relaxation delay of 15 seconds.

$^{29}$Si NMR Analysis. Collect $^{29}$Si NMR spectra using a Varian Unity INOVA 400 (400 MHz) spectrometer. Use deuterated chloroform as a solvent containing 0.2 M chromium (III) acetylacetonate. Use 256 scans and a relaxation delay of 13 seconds.

Materials

Table 1 and Table 2 identify materials for use in preparing samples described herein. “Me” refers to a methyl group, “Hex” refers to a hexyl group, and “Vi” refers to a vinyl group.

TABLE 1

| Component | Description | Source |
|---|---|---|
| Filler 1 | Spherical alumina (500 nanometers average particle size) | Available as A1000 SGD from Almatis. |
| Filler 2 | Spherical Alumina (2 μm average particle size) | Available as CB-P02 from Showa Denko |
| Filler 3 | Spherical Alumina (20 μm average particle size) | Available as A-SF-20 from Chalco |
| Filler 4 | Zinc oxide (0.12 μm average particle size) | Available as Zoco 102 from Zochem |
| Filler 5 | Alumina (3 μm average particle size) | Available as A-CF-3 from Chalco |
| Filler 6 | Alumina trihydrate (45 μm average particle size) | Available as MX-200 from R J Marshall |
| Filler 7 | Silver Flake (4 μm average particle size) | Available as RA-0127 from Metalor Technologies. |
| Filler 8 | Silver coated aluminum filler (45 μm average particle size) | Available as SA3002S20 from Potters Industries. |
| Filler 9 | Silver coated glass filler (90 μm average particle size) | Available as S2429S from Potters Industries. |
| Polymer 1 | Dimethyl phenylmethyl siloxane trimethyl terminated. 50 centistokes (cSt) kinematic viscosity. 45 milliPascal*s (mPa*s) dynamic viscosity. | Available as PMM-1015 from Gelest. |
| Polymer 2 | Dimethyl siloxane, vinyl dimethyl terminated. 60 mPa*s dynamic viscosity. | Available as DMS-V21 from Gelest. |
| Polymer 3 | Dimethylvinylated and trimethylated silica dispersed in dimethyl siloxane dimethylvinylsiloxy terminated. Vinyl MQ resin in vinyl siloxane (5400 mPa*s dynamic viscosity). | Prepare vinyl MQ resin in xylenes according to method of Daudt et al. U.S. Pat. No. 2,676,182A then dilute to 32 wt % vinyl MQ resin (solids basis) in Polymer 4. Strip to remove xylenes using rotary evaporator. |

TABLE 1-continued

| Component | Description | Source |
|---|---|---|
| Polymer 4 | $C{=}C{-}Si(CH_3)_2{-}[(CH_3)_2SiO]_{292}{-}Si(CH_3)_2{-}C{=}C$ 2000 mPa*s dynamic viscosity. | Available as DMS-V31 from Gelest. |
| Polymer 5 | Dimethyl siloxane, vinyl dimethyl terminated, 63 mPa*s dynamic viscosity. | Available as DMS-V21 from Gelest. |
| Polymer 6 | $H{-}Si(CH_3)_2{-}[(CH_3)_2SiO]_{110}{-}Si(CH_3)_2{-}H$. 160 mPa*s dynamic viscosity. | Available as DMS-H21 from Gelest. |
| Polymer 7 | $(CH_3)_3SiO[(CH_3)_2SiO]_{3.3}[(CH_3)HSiO]_6{-}Si(CH_3)_3$. 100 mPa*s dynamic viscosity. | Synthesize according to teachings in U.S. Pat. No. 2,823,218. |
| Crosslinker 1 | $(CH_3)_3SiO{-}[(CH_3)_2SiO]_{3.3}[(CH_3)HSiO]_{6.0}{-}Si(CH_3)_3$ | Available as HMS-501 from Gelest.. |
| Silane 1 | $A\text{-}(MeO)_2SiO{-}[(Me)(Vi)SiO]_x[Me_2SiO]_y(Me)_2Si\text{-}A$ where each A is glycidoxypropyl: $-(CH_2)_3OCH_2CH_2OCH_2$. Reaction product of 3-glycidoxypropyltrimethoxysilane and an oligomeric random copolymer diol of poly(methylvinylsiloxane-dimethylsiloxane) having a zero shear viscosity of 15 mPa-s at 25° C. and vinyl content of 6 wt % Vi. | Synthesize by condensation of 2 equivalents of 3-glycidoxypropyltrimethoxy silane and 1 equivalent oligomeric random copolymer diol of poly(methylvinylsiloxane-dimethylsiloxane), and remove volatile compounds by rotary evaporation. |
| Silane 2 | 1,6-bis(trimethoxysilyl) hexane | Available as SIB 1832.0 from Gelest. |
| Inhibitor 1 | Cyclic vinyl siloxane: $[(Me)(Vi)SiO]_4$ | SIT900.0 from Gelest. |
| Platinum Catalyst 1 | 1,3,-diethenyl-1,1,3,3-tetramethyldisiloxane platinum complex (21 wt % Pt). | Synthesize according to teachings in U.S. Pat. No. 5,312,937. |
| Platinum Catalyst 2 | 1,3,-diethenyl-1,1,3,3-tetramethyldisiloxane platinum complex (2 wt % Pt). | Prepare by combining 67 parts Gelest SIP6830.3 in 33 parts of Additive 6. |
| Inhibitor Solution 1 | A solution of 10% Inhibitor 1 diluted in Polymer 4. | Prepare as described below. |
| Catalyst Solution 1 | A solution of Catalyst 1 in toluene | Prepare as described below. |
| Catalyst Solution 2 | A solution of 10% Platinum Catalyst 2 diluted in Polymer 4. | Prepare as described below. |

TABLE 2

| Component | Description | Source |
|---|---|---|
| Additive 1 | Reaction product having an average of 0.6 anhydride group per molecule and having structure as described below. Dynamic viscosity is 814 mPa*s. | Prepare as described herein below. |
| Additive 2 | Reaction product having an average of 1.4 anhydride group per molecule and having structure as described below. Dynamic viscosity is 1660 mPa*s. | Prepare as described herein below. |
| Additive 3 | Reaction product having an average of 0.96 anhydride group per molecule and having structure as described below. Dynamic viscosity is 804 mPa*s. | Prepare as described herein below. |
| Additive 4 | Reaction product having an average of 0.56 anhydride group per molecule and having structure as described below. Dynamic viscosity is 217 mPa*s. | Prepare as described herein below. |
| Additive 5 | Reaction product having an average of 0.68 anhydride group per molecule and having structure as described below. Dynamic viscosity is 9960 mPa*s. | Prepare as described herein below. |
| Additive 6 | $ViMe_2SiO[Me_2SiO]_{177}SiMe_2Vi$ Dynamic viscosity is 443 mPa*s. | Prepared according to teachings in U.S. Pat. No. 4,329,273 |
| Additive 7 | 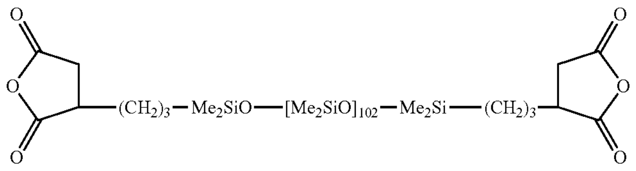 Dynamic viscosity is 720 mPa*s. | Prepare as described herein below |

TABLE 2-continued

| Component | Description | Source |
|---|---|---|
| Additive 8 | 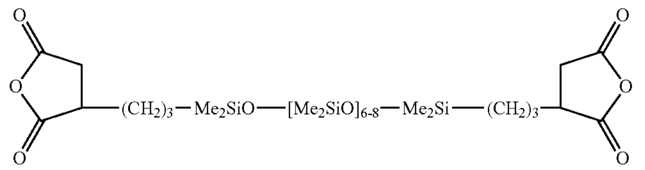 Dynamic viscosity is 100 mPa*s. | Available as DMS-Z21 form Gelest |
| Additive 9 | 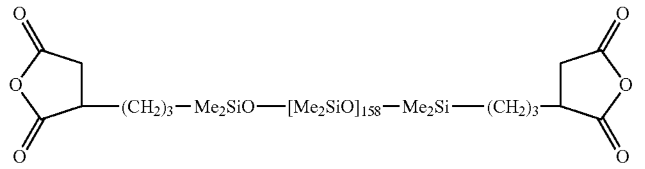 Dynamic viscosity is 7400 mPa*s. | Prepare as described herein below |
| Additive 10 | $Me_3SiO—[Me_2SiO]_{93}—[BMeSiO]_9—[HexMeSO]_6—Me_3Si$ Where B is: 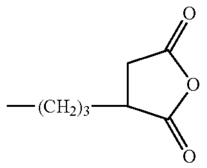 Dynamic viscosity is 2500 mPa*s. | Prepare as described herein below |

Preparation of Inhibitor Solution 1

Prepare Inhibitor Solution 1 in a dental cup by first adding 2.00 g of Inhibitor 1, followed by 18.00 g of Polymer 4. Mix the components together at 2000 RPM for 30 seconds using a FlackTek DAC150 speed mixer.

Preparation of Catalyst Solution 1

Prepare Catalyst Solution 1 in a 20 mL glass vial by first adding 0.43 g of Platinum Catalyst 1 to 10 g toluene (Sigma). Add stir bar and stir contents at 300 RPM for 15 minutes.

Preparation of Catalyst Solution 2

Prepare Catalyst Solution 2 in a dental cup by first adding 2.00 g of Platinum Catalyst 2, followed by 18.00 g of Polymer 4. The added components were then mixed at 2000 RPM for 30 seconds using a FlackTek DAC150 speed mixer.

Synthesis of Additive 1

To a clean, dry 500 milliliter (mL) round bottom 4-neck baffled flask that was baked out in an 80° C. oven, add 150 grams (g) dry meta-xylene (Aldrich) and 100 g Additive 6. Fit the flask with a water-cooled reflux condenser and flow dry nitrogen through the headspace, creating a slight positive pressure of nitrogen. Stir the mixture with a polytetrafluoroethylene blade at 120 revolutions per minute (RPM) and heat with a 500 mL sized heating mantle. Monitor the temperature of the contents of the flask with a dual independent Type K thermocouple immersed in the reaction mixture. Heat the mixture to 60° C. and then add 1.53 g of maleic anhydride (Aldrich, 1:1 anhydride to vinyl molar ratio), which fully dissolved under stirring. Then add 6.45 g dibenzoyl peroxide (Aldrich). Rinse reagent residue on the flask neck and funnel down into the mixture with the reaction solution. Raise the temperature to 120° C. and increase the stirring speed to 160 RPM. Allow the mixture to react for 2 hours and then replace the heating mantel with a cork ring and allow the flask contents to cool to 25° C. while maintaining a nitrogen sweep and stirring. Transfer the resulting clear, faintly yellow material to a one-liter rotovap flask and remove solvent under vacuum using the rotovap. Determine anhydride concentration by $^1H$ NMR spectroscopy as described herein above.

Synthesis of Additive 2

To a clean, dry 3-liter round bottom 4-neck baffled flask that was baked out in an 80° C. oven, add 850 grams (g) dry meta-xylene (Aldrich) and 600 g Additive 6. Fit the flask with a water-cooled reflux condenser and flow dry nitrogen through the headspace, creating a slight positive pressure of nitrogen. Stir the mixture with a polytetrafluoroethylene blade at 155 revolutions per minute (RPM) and heat with a 3-liter sized heating mantle. Monitor the temperature of the contents of the flask with a dual independent Type K thermocouple immersed in the reaction mixture. Heat the mixture to 60° C. and then add 18.3 g of maleic anhydride (Aldrich, 2:1 anhydride to vinyl molar ratio), which fully dissolved under stirring. Then add 39 g dibenzoyl peroxide (Aldrich). Add an additional 25 g of meta-xylene to rinse the jar and transfer to the round bottom flask. Rinse reagent residue on the flask neck and funnel down into the mixture with the reaction solution. Raise the temperature to 120° C. and increase the stirring speed to 190 RPM. Allow the mixture to react for 3 hours and then replace the heating mantel with a cork ring and allow the flask contents to cool to 25° C. while maintaining a nitrogen sweep and stirring.

Transfer the resulting clear, faintly yellow material to a 1-liter Nalgene bottles. Remove solvent using a rotary evaporator under vacuum. Determine anhydride concentration by $^1H$ NMR spectroscopy as described herein above.

Synthesis of Additive 3

To a clean, dry 500 milliliter (mL) round bottom 4-neck baffled flask that was baked out in an 80° C. oven, add 150 grams (g) dry meta-xylene (Aldrich) and 150 g of Polymer 5. Fit the flask with a water-cooled reflux condenser and flow dry nitrogen through the headspace, creating a slight positive pressure of nitrogen. Stir the mixture with a polytetrafluoroethylene blade at 100 revolutions per minute (RPM) and heat with a 500 mL sized heating mantle. Monitor the temperature of the contents of the flask with a dual independent Type K thermocouple immersed in the reaction mixture. Heat the mixture to 60° C. and then add 7.34 g of maleic anhydride (Aldrich, 1:1 anhydride to vinyl molar ratio), which fully dissolved under stirring. Then add 7.8 g dibenzoyl peroxide (Aldrich). Rinse reagent residue on the flask neck and funnel down into the mixture with the reaction solution. Raise the temperature to 120° C. and increase the stirring speed to 190 RPM. Allow the mixture to react for 2 hours and then replace the heating mantel with a cork ring and allow the flask contents to cool to 25° C. while maintaining a nitrogen sweep and stirring. Transfer the resulting clear, faintly yellow material to a one-liter rotovap flask and remove solvent. Determine anhydride concentration by $^1H$ NMR spectroscopy as described herein above.

Synthesis of Additive 4

To a clean, dry 500 milliliter (mL) round bottom 4-neck baffled flask that was baked out in an 80° C. oven, add 150 grams (g) dry meta-xylene (Aldrich) and 150 g of Polymer 5. Fit the flask with a water-cooled reflux condenser and flow dry nitrogen through the headspace, creating a slight positive pressure of nitrogen. Stir the mixture with a polytetrafluoroethylene blade at 100 revolutions per minute (RPM) and heat with a 500 mL sized heating mantle. Monitor the temperature of the contents of the flask with a dual independent Type K thermocouple immersed in the reaction mixture. Heat the mixture to 60° C. and then add 7.34 g of maleic anhydride (Aldrich, 1:1 anhydride to vinyl molar ratio), which fully dissolved under stirring. Then add 7.8 g dibenzoyl peroxide (Aldrich). Rinse reagent residue on the flask neck and funnel down into the mixture with the reaction solution. Raise the temperature to 120° C. and increase the stirring speed to 190 RPM. Allow the mixture to react for 2 hours and then replace the heating mantel with a cork ring and allow the flask contents to cool to 25° C. while maintaining a nitrogen sweep and stirring. Transfer the resulting clear, faintly yellow material to a one-liter rotovap flask and remove solvent Determine anhydride concentration by 1H NMR spectroscopy as described herein above.

Synthesis of Additive 5

First, prepare SiH Terminated Siloxane 1 in the following manner: to an oven-dried 3-neck 1 Liter flask equipped with a reflux condenser, stir rod, temperature probe and nitrogen purge add 494.03 grams (g) of decamethylcyclopentasiloxane (available as DOWSIL™ 245 Fluid from The Dow Chemical Company) and 6.03 g tetramethyldisiloxane (available as DOWSIL™ 3-7010 Fluid from The Dow Chemical Company). Add trifluoromethanesulfonic acid (0.25 milliliters from Sigma Aldrich) and stir at 175 RPM. Heat the contents of the flask to 70° C. and allow to stir form 8 hours. Cool the contents of the flask to 40° C. and add 6.47 g sodium bicarbonate (Sigma Aldrich) to form a mixture. All the mixture to continue mixing for 2 hours and then allow the mixture to cool to 25° C. Filter the mixture through a Nylon mesh (0.45 micrometer, available from Whatman). Heat the filtrate to 150° C. under vacuum (1.3 Pascals, 10 milliTorr) for 4 hours to remove volatiles to obtain the SiH Terminated Siloxane 1.

Then, prepare Additive 5 in the following manner: to an oven-dried 3-neck 100 mL round bottom flask equipped with a magnetic stir bar, water-cooled condenser, glass thermocouple and addition funnel, add 48.84 g of SiH Terminated Siloxane 1. Heat the contents of the flask to 60° C. and add 5 drops of ally succinic anhydride (Wako) and allow to stir for 5 minutes at 600 RPM. Add 33 microliters of Catalyst Solution 1 and stir at 60° C. for 10 minutes. Feed 0.35 g of allyl succinic anhydride dropwise over the course of 20 minutes. Allow the reaction to continue mixing for one hour. Allow mixture to cool to 25° C. and analyze the reaction product (Additive 5) by 1H NMR spectroscopy $^{29}Si$ NMR spectroscopy to determine structure.

Synthesis of Additive 7

To a one-liter three necked flask equipped with a reflux condenser, stir rod, temperature probe, and nitrogen purge add 192.42 g of Polymer 6, 7.58 g of allyl succinic anhydride (Wako) and 22.20 g isododecane (Fischer Scientific). Heat the contents of the flask to 75° C. while stirring. Add 0.76 grams of Catalyst Solution 1. Stir the solution at 80° C. for 2 hours. Heat the contents of the flask to 135° C. under vacuum (1.3 Pascals, 10 milliTorr) for two hours to remove volatiles obtain Additive 7. Characterize Additive 7 by $^1H$ NMR spectroscopy $^{29}Si$ NMR spectroscopy to determine structure.

Synthesis of Additive 9

Prepare Additive 9 in like manner as Additive 5 except feed 1.16 g of allyl succinic anhydride over 20 minutes instead of 0.35 g of allyl succinic anhydride.

Synthesis of Additive 10

To a one-liter three necked flask equipped with a reflux condenser, stir rod, temperature probe and nitrogen purge, add 412.18 g of Polymer 7, 61.96 g allyl succinic anhydride (Wako) and 55.56 g isododecane (Fischer Scientific). Heat the contents of the flask to 76° C. while stirring, then add 0.53 grams of Catalyst Solution 1 and stir at 80° C. for 2 hours. Reduce heat to 60° C., then add 45 grams of 1-hexene (Sigma) and 0.25 grams of Catalyst Solution 1. Stir at 60° C. for 2 hours. Heat the contents of the flask to 135° C. under vacuum (1.3 Pascals, 10 milliTorr) for 2 hours to remove volatiles. Characterize Additive 10 by $^1H$ NMR spectroscopy 29Si NMR spectroscopy to determine structure.

Compositions

PART I: Thermally Conductive Compositions with Various Additives

Preparation of Samples. Prepare samples in a dental cup by first adding the Polymer 1 component. If the composition contains an Additive, add the Additive component and mix using a FlackTek DAC150 speed mixer at 2000 RPM for 20 seconds, otherwise proceed with adding Filler 1. Add the Filler 1 component and mix at 2000 RPM for 20 seconds followed by hand mixing. Add the Filler 2 component and mix at 2000 RPM for 20 seconds followed by hand mixing. Add the Filler 3 component and mix at 2500 RPM for 20 seconds followed by hand mixing. Mix a second time at 2500 RPM for 20 seconds. Heat the resulting mixture to 150° C. in a vacuum oven at a pressure of 3.066 kiloPacals (23 millimeter mercury) pressure for one hour to obtain the final sample Table 3 lists the sample formulations for Part I showing grams (g) of each component and the characterization of those samples. .

Some observations from the data in Table 3 include:

(a) Use of 82 vol % filler is too high to achieve low-shear viscosity reduction with the Additives.

(b) The average number of anhydride groups per additive molecule must be less than 2 in order to cause a low-shear viscosity reduction. Compare, for example, Sample T with Samples 9, 11, 15 and 22.

(c) The average number of anhydride groups per additive molecule must be greater than zero in order to cause a low-shear viscosity reduction. Compare, for example, Sample Q with Samples 9 and 11 as well as Sample P with Samples 8 and 10.

TABLE 3

| | Additive | | | Polymer | Filler | Filler | Filler | Filler | Low-Shear | Low-Shear Viscosity |
|---|---|---|---|---|---|---|---|---|---|---|
| Sample | Identity | (g) | (wt %) | 1 | 1 | 2 | 3 | (vol %) | Viscosity (Pa*s) | % Change [1] |
| Reference A | (NONE) | 0 | 0 | 4.009 | 1.598 | 4.979 | 9.594 | 50 | 13 | N/A |
| Reference B | (NONE) | 0 | 0 | 5.818 | 5.417 | 16.256 | 32.507 | 70 | 58 | N/A |
| Reference C | (NONE) | 0 | 0 | 5.330 | 5.466 | 16.399 | 32.806 | 72 | 76 | N/A |
| Reference D | (NONE) | 0 | 0 | 4.179 | 5.583 | 16.745 | 33.493 | 77 | 129 | N/A |
| Reference E | (NONE) | 0 | 0 | 3.540 | 5.640 | 16.920 | 33.900 | 80 | 147 | N/A |
| Reference F | (NONE) | 0 | 0 | 3.129 | 5.687 | 17.061 | 34.123 | 82 | 180 | N/A |
| G | 1 | 0.0353 | 0.1 | 1.534 | 2.844 | 8.532 | 17.061 | 82 | 1601 | +789 |
| H | 1 | 0.154 | 0.5 | 1.413 | 2.844 | 8.531 | 17.063 | 82 | 1277 | +609 |
| I | 1 | 0.903 | 1.5 | 2.208 | 5.689 | 17.067 | 34.133 | 82 | 313 | +74 |
| J | 1 | 1.798 | 3 | 1.298 | 5.690 | 17.072 | 34.144 | 82 | 310 | +72 |
| 1 | 1 | 0.989 | 1.6 | 4.811 | 5.419 | 16.261 | 32.520 | 70 | 5 | −91 |
| 2 | 1 | 0.060 | 0.1 | 5.270 | 5.467 | 16.402 | 32.803 | 72 | 52 | −32 |
| 3 | 1 | 0.308 | 0.5 | 5.025 | 5.467 | 16.404 | 32.806 | 72 | 20 | −74 |
| 4 | 1 | 1.005 | 1.7 | 4.315 | 5.469 | 16.405 | 32.815 | 72 | 8 | −89 |
| 5 | 1 | 0.316 | 0.5 | 3.868 | 5.583 | 16.747 | 33.496 | 77 | 43 | −67 |
| 6 | 1 | 0.634 | 1 | 3.544 | 5.584 | 16.751 | 33.498 | 77 | 27 | −79 |
| 7 | 1 | 0.902 | 1.5 | 3.272 | 5.584 | 16.751 | 33.504 | 77 | 27 | −79 |
| 8 | 1 | 1.202 | 2 | 2.954 | 5.584 | 16.753 | 33.506 | 77 | 16 | −88 |
| 9 | 1 | 1.023 | 1.7 | 2.495 | 5.648 | 16.945 | 33.889 | 80 | 39 | −73 |
| K | 2 | 0.903 | 1.5 | 2.208 | 5.689 | 17.067 | 34.144 | 82 | 1670 | +1195 |
| 10 | 2 | 1.202 | 2 | 2.954 | 5.584 | 16.753 | 33.506 | 77 | 18 | −86 |
| 11 | 2 | 1.023 | 1.7 | 2.495 | 5.648 | 16.945 | 33.889 | 80 | 120 | −18 |
| L | 3 | 0.020 | 0.1 | 1.161 | 1.881 | 5.646 | 11.294 | 80 | 1020 | +594 |
| M | 3 | 0.099 | 0.5 | 1.077 | 1.882 | 5.646 | 11.293 | 80 | 3057 | +1980 |
| 12 | 3 | 0.104 | 0.5 | 1.839 | 1.806 | 5.419 | 10.836 | 70 | 19 | −67 |
| 13 | 3 | 0.402 | 2 | 1.534 | 1.807 | 5.420 | 10.840 | 70 | 3.5 | −94 |
| 14 | 3 | 0.303 | 1.5 | 1.087 | 1.861 | 5.585 | 11.167 | 77 | 13 | −90 |
| 15 | 3 | 0.399 | 2 | 0.772 | 1.884 | 5.650 | 11.296 | 80 | 29 | −80 |
| N | 4 | 0.19 | 0.1 | 1.160 | 1.882 | 5.646 | 11.293 | 80 | 237 | +61 |
| O | 4 | 0.100 | 0.5 | 1.077 | 1.882 | 5.647 | 11.294 | 80 | 158 | +7 |
| 16 | 4 | 0.025 | 0.1 | 3.987 | 1.601 | 4.797 | 9.596 | 50 | 5 | −62 |
| 17 | 4 | 0.111 | 0.5 | 3.906 | 1.599 | 4.799 | 9.595 | 50 | 1.6 | −88 |
| 18 | 4 | 0.401 | 2 | 3.603 | 1.600 | 4.800 | 9.599 | 50 | 0.7 | −95 |
| 19 | 4 | 0.019 | 0.1 | 1.921 | 1.806 | 5.418 | 10.836 | 70 | 39 | −33 |
| 20 | 4 | 0.099 | 0.5 | 1.839 | 1.806 | 5.419 | 10.837 | 70 | 11 | −81 |
| 21 | 4 | 0.399 | 2 | 1.533 | 1.807 | 5.420 | 10.841 | 70 | 3.5 | −94 |
| 22 | 4 | 0.399 | 2 | 0.772 | 1.883 | 4.649 | 11.297 | 80 | 17 | −88 |
| 23 | 5 | 0.304 | 1.5 | 1.088 | 1.861 | 5.583 | 11.168 | 77 | 25 | −81 |
| P | 6 | 1.202 | 2 | 1.954 | 5.584 | 16.753 | 33.506 | 77 | 183 | +42 |
| Q | 6 | 1.023 | 1.7 | 2.495 | 5.648 | 16.945 | 33.889 | 80 | 2107 | +1333 |
| R | 6 | 0.903 | 1.5 | 2.208 | 5.689 | 17.067 | 34.133 | 82 | NA[2] | NA[2] |
| S | 7 | 1.202 | 2 | 2.954 | 5.584 | 16.753 | 33.506 | 77 | 434 | +236 |
| T | 7 | 1.023 | 1.7 | 2.495 | 5.648 | 16.945 | 33.889 | 80 | NA[2] | NA[2] |
| U | 7 | 0.903 | 1.5 | 2.208 | 5.689 | 17.067 | 34.133 | 82 | NA[2] | NA[2] |
| V | 8 | 1.202 | 2 | 2.954 | 5.584 | 16.753 | 33.506 | 77 | NA[2] | NA[2] |
| W | 9 | 1.202 | 2 | 2.954 | 5.584 | 16.753 | 33.506 | 77 | NA[2] | NA[2] |
| X | 10 | 1.202 | 2 | 2.954 | 5.584 | 16.753 | 33.506 | 77 | NA[2] | NA[2] |

[1] Low-Shear Viscosity Change is relative to Sample Reference A-F having the same vol % filler

[2] Compositions are too thick to measure viscosity.

PART II: Additive 1 in Vinyl Siloxane Thermally Conductive Compositions

Prepare Samples Reference Y and 24 in like manner as in Part I, except use Polymer 2 instead of Polymer 1 in the procedure. For Reference Y use 2.864 g Polymer 2, 1.714 g Filler 1, 5.141 g Filler 2, and 10.282 g of Filler 3. For Sample 24, use 0.305 Additive 1, 2.558 g Polymer 2, 1.714 g Filler 1, 5.142 g Filler 2, and 10.285 g of Filler 3. Table 4 presents characterizations for these two samples. "Low-Shear Viscosity % Reduction" for Sample 24 is relative to Reference Y.

TABLE 4

| Sample | wt % Additive | Vol % Filler | Low-Shear Viscosity (Pa*s) | Low-Shear Viscosity % Change |
|---|---|---|---|---|
| Reference Y | 0 | 60 | 1838 | NA |
| 24 | 1.5 | 60 | 9 | −100 |

PART III: Thermally Conductive Compositions with Zinc Oxide and Aluminum Trihydrate Fillers Prepare Samples Reference Z and 25 in like manner as in Part I, except use Fillers 4, 5 and 6 instead of Fillers 1, 2 and 3. For Reference Z use 3.461 g Polymer 1, 3.530 g Filler 4, 4.762 g Filler 5, and 8.245 g of Filler 6. For Sample 25, use 0.305 Additive 1, 3.155 g Polymer 1, 3.529 g Filler 4, 4.766 g Filler 5, and 8.250 g of Filler 6. Table 5 presents characterizations for these two samples. "Low-Shear Viscosity % Reduction" for Sample 25 is relative to Reference Z.

TABLE 5

| Sample | wt % Additive | Vol % Filler | Low-Shear Viscosity (Pa*s) | Low-Shear Viscosity % Change |
|---|---|---|---|---|
| Reference Z | 0 | 60 | 117 | NA |
| 25 | 1.5 | 60 | 31 | −74 |

PART IV: Curable Electrically Conductive Compositions with Additive 1

Table 6 presents the formulations (components amounts listed in grams) for Reference Sample AA and Samples BB, CC and 26-29. Table 7 present characterizations of the formulations. "Low-Shear Viscosity % Reduction" is relative to Reference AA.

Prepare the sample formulations in a dental cup by adding the specified amounts of Polymer 3, Polymer 4, any specified Additive, Silane 1, Silane 2, and Filler 7. Gently hand mix the components together and then mix for 30 seconds at 1600 RPM with a FlackTek speed mixer. Add Filler 8 and gently hand mix and then mix for 30 seconds at 1600 RPM with a FlackTek speed mixer. Add Filler 9 and then mix for 30 seconds at 1600 RPM with a FlackTek speed mixer. Add the specified amount of Inhibitor Solution 1 and Crosslinker 1. Gently mix by hand and then mix for 30 seconds at 1600 RPM with a FlackTek speed mixer. Add the specified amount of Catalyst Solution 2. Gently mix by hand and then mix for 30 seconds at 1600 RPM with a FlackTek speed mixer.

TABLE 7

| | Additive | | Vol % | Low-Shear Viscosity | Low-Shear Viscosity % |
|---|---|---|---|---|---|
| Sample | Type | Wt % | Filler | (Pa*s) | Change |
| Reference AA | (none) | 0 | 54.8 | 12168 | NA |
| BB | 6 | 1 | 54.8 | 8899 | −27* |
| CC | 1 | 0.1 | 54.8 | 12467 | +2.57 |
| 26 | 1 | 0.5 | 54.8 | 2961 | −76 |
| 27 | 1 | 1 | 54.8 | 1626 | −87 |
| 28 | 1 | 1.5 | 54.8 | 933 | −92 |
| 29 | 1 | 2 | 54.8 | 559 | −95 |

*Additive 6 results in viscosity reduction presumably because it has a lower viscosity than the matrix polymer in this formulation

What is claimed is:

1. A composition comprising:

a. a first polyorganosiloxane;

b. 50-80 volume-percent, based on composition volume, of conductive fillers; and c. 0.1 to 2.0 weight-percent, based on composition weight, of a second polyorganosiloxane different from the first polyorganosiloxane, the second polyorganosiloxane having an average of 0.5 to 1.5 anhydride groups per molecule;

wherein the second polyorganosiloxane has average chemical structure (II):

$$R''R_2SiO—(R_2SiO)_n—SiR_2R'' \quad (II)$$

where "n" has an average value in a range of 40 to 200, R is independently in each occurrence selected from a group consisting of $C_1$-$C_8$ hydrocarbyl groups, and R" is independently in each occurrence selected from a group consisting of $C_1$-$C_8$ hydrocarbyl groups, and anhydride groups; and where the first polyorganosiloxane has a lower dynamic viscosity than the second polyorganosiloxane.

2. The composition of claim 1, wherein the first polyorganosiloxane is free of anhydride groups.

3. The composition of claim 2, wherein the first polyorganosiloxane has average chemical structure (I):

$$R'R_2SiO—(R_2SiO)_m—SiR_2R' \quad (I)$$

where each R and R' is independently in each occurrence selected from a group consisting of $C_1$-$C_8$ hydrocarbyl groups and "m" is selected so that the first polyorganosiloxane has an average dynamic viscosity in a range of 0.04 to 55 Pascal*seconds.

4. The composition of claim 3, wherein each R' is independently selected from vinyl and methyl groups.

5. The composition of claim 1, wherein the conductive filler is any one or any combination of more than one selected from a group consisting of alumina, zinc oxide,

TABLE 6

| | Additive | | Polymer | Polymer | Silane | Silane | Crosslinker | Inhibitor | Catalyst | Filler | Filler | Filler |
|---|---|---|---|---|---|---|---|---|---|---|---|---|
| Sample | Type | Wt % | 3 | 4 | 1 | 2 | 1 | Solution 1 | Solution 2 | 7 | 8 | 9 |
| Reference AA | (none) | 0 | 5.110 | 1.278 | 0.406 | 0.041 | 0.573 | 0.445 | 0.276 | 3.822 | 19.110 | 8.941 |
| BB | 6 | 1 | 4.858 | 1.215 | 0.386 | 0.039 | 0.545 | 0.423 | 0.262 | 3.822 | 19.110 | 8.941 |
| CC | 1 | 0.1 | 5.084 | 1.271 | 0.404 | 0.041 | 0.57 | 0.443 | 0.275 | 3.822 | 19.110 | 8.941 |
| 26 | 1 | 0.5 | 4.984 | 1.246 | 0.396 | 0.04 | 0.559 | 0.434 | 0.269 | 3.822 | 19.110 | 8.941 |
| 27 | 1 | 1 | 4.858 | 1.215 | 0.386 | 0.039 | 0.545 | 0.423 | 0.262 | 3.822 | 19.110 | 8.941 |
| 28 | 1 | 1.5 | 4.732 | 1.183 | 0.376 | 0.038 | 0.531 | 0.412 | 0.256 | 3.822 | 19.110 | 8.941 |
| 29 | 1 | 2 | 4.607 | 1.152 | 0.366 | 0.037 | 0.516 | 0.401 | 0.249 | 3.822 | 19.110 | 8.941 |

alumina trihydrate, boron nitride, aluminum nitride, silver flake, and silver coated particulates.

6. The composition of claim 1, where the anhydride groups have average chemical structure (III):

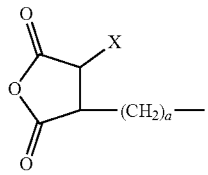

(iii)

where X is independently in each occurrence selected from hydrogen and $C_1$-$C_8$ hydrocarbyl-containing groups and "a" is independently in each occurrence a value in a range of one to 6.

7. The composition of claim 6, wherein either X is independently in each occurrence selected from hydrogen and an aromatic group and "a" is 2, or X is hydrogen and "a" is 3.

8. The composition of claim 6, wherein X is independently in each occurrence an aromatic group.

* * * * *